US011631061B2

(12) United States Patent
Brook et al.

(10) Patent No.: US 11,631,061 B2
(45) Date of Patent: Apr. 18, 2023

(54) METHOD FOR CREATING AND MAINTAINING A DISTRIBUTED LEDGER OF VEHICLE GAS CONSUMPTION AND WEAR AND TEAR INFORMATION

(71) Applicant: BlueOwl, LLC, San Francisco, CA (US)

(72) Inventors: Callum Brook, Piedmont, CA (US); Theobolt N. Leung, San Francisco, CA (US)

(73) Assignee: BlueOwl, LLC, San Francisco, CA (US)

( * ) Notice: Subject to any disclaimer, the term of this patent is extended or adjusted under 35 U.S.C. 154(b) by 0 days.

(21) Appl. No.: 16/940,220

(22) Filed: Jul. 27, 2020

(65) Prior Publication Data
US 2022/0292463 A1  Sep. 15, 2022

(51) Int. Cl.
G06Q 10/00 (2012.01)
G06Q 10/20 (2023.01)
G06F 16/23 (2019.01)
H04L 9/32 (2006.01)
G06Q 40/08 (2012.01)
G06N 20/00 (2019.01)

(52) U.S. Cl.
CPC ......... *G06Q 10/20* (2013.01); *G06F 16/2379* (2019.01); *G06N 20/00* (2019.01); *G06Q 40/08* (2013.01); *H04L 9/32* (2013.01)

(58) Field of Classification Search
CPC .................................................... G06Q 10/20
USPC ............................................................ 705/4
See application file for complete search history.

(56) References Cited

U.S. PATENT DOCUMENTS

| 7,143,007 | B2 | 11/2006 | Long et al. |
| 9,165,413 | B2 | 10/2015 | Jones et al. |
| 9,181,895 | B2 | 11/2015 | Roberts et al. |
| 10,839,015 | B1* | 11/2020 | Leise ...................... G06F 21/64 |
| 11,164,406 | B2* | 11/2021 | Meroux ............... G08G 1/0112 |
| 2012/0239478 | A1* | 9/2012 | Yang ................ G06Q 10/06398 705/14.23 |
| 2015/0228129 | A1* | 8/2015 | Cox ........................ G06Q 10/08 701/1 |
| 2016/0371788 | A1 | 12/2016 | Rackley et al. |
| 2017/0046669 | A1* | 2/2017 | Chow ................ G06Q 10/0631 |
| 2018/0202822 | A1* | 7/2018 | DeLizio .................. B60R 25/24 |
| 2018/0374283 | A1* | 12/2018 | Pickover ................ G07C 5/085 |

(Continued)

FOREIGN PATENT DOCUMENTS

| EP | 1548653 A2 | 6/2005 |
| FR | 3056000 A1 | 3/2018 |
| GB | 2562054 A | 11/2018 |

OTHER PUBLICATIONS

Blockchain Based Verification Of Vehicle History For Pre-owned Vehicle Industry IEEE (Year: 2021).*

(Continued)

*Primary Examiner* — Bruce I Ebersman
(74) *Attorney, Agent, or Firm* — Faegre Drinker Biddle & Reath LLP

(57) ABSTRACT

A distributed ledger operated by a group of network participants according to a set of consensus rules stores vehicle condition data and generated vehicle condition reports, The vehicle condition data may be received directly from a vehicle or an associated mobile device and the vehicle condition report may be accessed by an authorized user.

14 Claims, 7 Drawing Sheets

(56) References Cited

U.S. PATENT DOCUMENTS

| | | | |
|---|---|---|---|
| 2019/0173854 A1 | 6/2019 | Beck | |
| 2019/0378352 A1* | 12/2019 | Dey | G07C 5/008 |
| 2020/0005559 A1* | 1/2020 | Grunbok, II | H04L 9/3239 |
| 2020/0073864 A1* | 3/2020 | Jo | G06F 21/64 |
| 2020/0074853 A1* | 3/2020 | Miller | H04W 4/02 |
| 2020/0081699 A1* | 3/2020 | Majed | G06F 8/65 |
| 2020/0200090 A1* | 6/2020 | Costello | G06F 21/64 |
| 2020/0213329 A1* | 7/2020 | Simons | G06F 21/6254 |
| 2020/0226559 A1* | 7/2020 | Boss | H04L 9/3239 |
| 2020/0242858 A1* | 7/2020 | Meroux | G07C 5/085 |
| 2020/0311665 A1* | 10/2020 | Gray | H04L 9/3242 |
| 2020/0402149 A1* | 12/2020 | Dutta | G06Q 30/0282 |
| 2020/0402391 A1* | 12/2020 | Dutta | G08G 1/017 |
| 2021/0105276 A1* | 4/2021 | Collinson | H04L 63/0435 |
| 2021/0133670 A1* | 5/2021 | Cella | G06N 5/04 |
| 2021/0239478 A1* | 8/2021 | Mathai | G06Q 10/20 |
| 2022/0244736 A1 | 8/2022 | Konrardy et al. | |

OTHER PUBLICATIONS

Trust and Reputation in Vehicular Networks: A Smart Contract-Based Approach IEEE (Year: 2019).*

Bartosiak, Dave, "Crypto-car-ency? Porsche brings the blockchain to autos", TheDrive, available online at <https://www.thedrive.com/tech/18712/crypto-car-ency-porsche-brings-the-blockchain-to-autos>, 2018, 6 pages.

Gaurav Yadav, "Blockchain writing a new chapter for automotive industry", available online at <https://hackernoon.com/blockchain-writing-a-new-chapter-for-automotive-industry-48a8151eec99>, 2018, 11 pages.

Javier E. Meseguer Anastasio, "A novel framework to promote eco-driving through smartphone-vehicle integration", Doctoral thesis, Universitat Politècnica de València, 2017, 154 pages.

Kyle A. Owens, "Brave new wheels? Potential uses for blockchain technology in auto finance", NextGen Financial Services Report, Financial Services Industry Group at Dykema, available online at <https://www.nextgenfinancialservicesreport.com/2018/10/brave-new-wheels-potential-uses-blockchain-technology-auto-finance/>, Oct. 24, 2018, 6 pages.

Shell, "In-vehicle monitoring systems improve driving skills", available online at <https://www.shell.com/business-customers/shell-fleet-solutions/health-security-safety-and-the-environment/in-vehicle-monitoring-systems-can-help-everyone-to-improve-their-driving-skills.html>, retrieved on Oct. 25, 2021, 5 pages.

SinglePoint, Inc., "SinglePoint Subsidiary ShieldSaver Inks Deal with CarFax; Continuing Expansion of Data Collection for Automotive Blockchain Initiative", available online at <https://www.globenewswire.com/news-release/2018/05/01/1493968/0/en/SinglePoint-Subsidiary-ShieldSaver-Inks-Deal-with-CarFax-Continuing-Expansion-of-Data-Collection-for-Automotive-Blockchain-Initiative.html>, 2018, 4 pages.

* cited by examiner

METHOD FOR CREATING AND MAINTAINING A DISTRIBUTED LEDGER OF VEHICLE GAS CONSUMPTION AND WEAR AND TEAR INFORMATION

FIELD OF THE DISCLOSURE

Systems and methods are disclosed with respect to using a blockchain for verifying vehicle longevity based at least in part upon vehicle condition information.

BACKGROUND

Determining the condition and/or value of a used vehicle may be important for a variety of reasons. For example, a customer purchasing a vehicle may wish to have an accurate assessment of the value of the vehicle. Additionally, a car manufacturer leasing vehicles may wish to determine an accurate value of the vehicles after the terms of the leases end. Further, insurance companies or regulatory companies may wish to determine an accurate value of vehicles that they insure and/or monitor. However, accurate vehicle assessment may be difficult to conduct and verify. For example, parties may incorrectly report vehicle condition data purposefully or accidentally. Additionally, parties may not disclose calculations used to determine vehicle condition or valuation.

Traditionally, vehicle manufacturers, insurance companies, vehicle rental companies, regulatory organizations, and/or other organizations involved in determining the value of a vehicle have limited access to information about the vehicles, such as year, make, model, mileage and physical appearance. Organizations which are able to receive more specific information regarding how the vehicle was driven have to rely on the information being reported accurately and may be unable to prevent the information from being tampered with. Often this information is stored in centralized databases held by the organizations. However, the centralized databases are vulnerable to attacks from unauthorized parties attempting to access the information.

BRIEF SUMMARY

In one aspect, a computer-implemented method for verifying longevity of vehicles using a distributed ledger maintained by a plurality of participants includes obtaining, at one or more processors, vehicle condition data associated with a vehicle indicative of wear and tear on the vehicle or fuel efficiency of the vehicle and the vehicle condition data indicative of a longevity of the vehicle. The method also includes generating, by the one or more processors, a transaction including a representation of the vehicle condition data, wherein the transaction is stored in the distributed ledger and transmitting, by the one or more processors, the transaction to at least one other participant in a distributed ledger network of participants maintaining the distributed ledger. A vehicle condition report is generated based at least in part upon the vehicle condition data and includes one or more descriptors indicative of the condition of the vehicle.

In certain embodiments, the plurality of participants maintaining the distributed ledger may include one or more of an insurance company, a regulator organization, a vehicle rental company, or a vehicle manufacturer. In certain embodiments, the vehicle condition data may be obtained from the vehicle and generating the transaction may include obtaining identity data associated with the vehicle and augmenting the transaction with the identity data.

In certain embodiments, the vehicle condition data may be obtained from one or more sensors on a user mobile device in the vehicle, sensors in the vehicle, images associated with the vehicle taken by the user mobile device, or information associated with the vehicle input via the user mobile device. In certain embodiments, the method may further include adding the transaction to a block of transactions, solving a cryptographic puzzle based at least in part upon the block of transactions, adding the solution to the cryptographic puzzle to the block of transactions and transmitting the block of transactions to at least one other participant in the distributed ledger network.

In certain embodiments, generating a transaction may include generating a transaction including a cryptographic hash value corresponding to the vehicle condition data and comprise transmitting, by the one or more processors, the vehicle condition data to a server computing device that generates the vehicle condition report based at least in part upon the vehicle condition data. Transmitting the transaction may include transmitting, by the one or more processors, the transaction to an address that stores a smart contract on the distributed ledger, wherein the smart contract generates the vehicle condition report based at least in part upon the vehicle condition data collected over a period of time. The vehicle condition data may be obtained in near real-time.

In certain embodiments, generating the transaction may include obtaining, by the one or more processors, a plurality of sets of vehicle condition data, each set of vehicle condition data obtained at a different time, and generating a plurality of transactions each including a representation of one of the sets of vehicle condition data obtained at a particular time. The transaction may include one of identity data associated with the vehicle, identity data associated with a computing device in the vehicle transmitting the transaction, the vehicle condition data or an indication of a time in which the vehicle condition data were generated.

In another aspect, a validating network node for validating vehicle condition data transactions in a distributed ledger network includes a transceiver configured to exchange distributed ledger data with peer network nodes, the distributed ledger data including transactions having vehicle condition data indicative of wear and tear on the vehicle or fuel efficiency of the vehicle. The vehicle condition data indicative of a longevity of the vehicle. The validation network node also includes a storage media configured to store a copy of the distributed ledger and a validator configured to apply a set of consensus rules to the distributed ledger data received from the peer network nodes, the validator being further configured to append the distributed ledger data received from the peer network nodes to the copy of the distributed ledger if the distributed ledger data satisfies the consensus rules.

In certain embodiments, the validator may additionally execute code in a smart contract that generates a vehicle condition report based at least in part upon the vehicle condition data and update a state database for the smart contract, the state database including one or more sets of vehicle condition data. The vehicle condition report may include a vehicle condition metric including one or more of an estimated lifetime of the vehicle, an estimated value of the vehicle, or an estimated average fuel consumption of the vehicle. The vehicle condition metric may include training a machine learning model for determining the vehicle condition metric.

In certain embodiments, the vehicle condition report may be generated further based at least in part upon receiving a payment from an authorized user. The smart contract may be a first smart contract, the vehicle condition report may be a first vehicle condition report, and the validator may be further configured to execute code in one or more additional smart contracts that generate one or more additional vehicle condition reports based at least in part upon the vehicle condition data. The validating network node may send a first vehicle condition report to a first authorized user and a second vehicle condition report to a second authorized user.

In yet another aspect a computing device for creating a smart contract for generating a vehicle condition report based at least in part upon vehicle condition data associated with a vehicle includes one or more processors, a communication unit, and a non-transitory computer-readable medium coupled to the one or more processors and the communication unit. The non-transitory computer-readable medium stores instructions that when executed by the one or more processors, cause the computing device to generate a smart contract that obtains vehicle condition data associated with a vehicle collected over a period of time and generates a vehicle condition report based at least in part upon an analysis of the vehicle condition data collected over the period of time, the vehicle condition data indicative of (i) wear and tear on the vehicle or (ii) fuel efficiency of the vehicle, the vehicle condition data indicative of a longevity of the vehicle and deploy the smart contract to an address stored on the distributed ledger maintained by the plurality of participants in a distributed ledger network.

Depending upon the embodiment, one or more benefits may be achieved. These benefits and various additional objects, features and advantages of the present disclosure can be fully appreciated with reference to the detailed description and accompanying drawings that follow.

DETAILED DESCRIPTION

Figure 1:
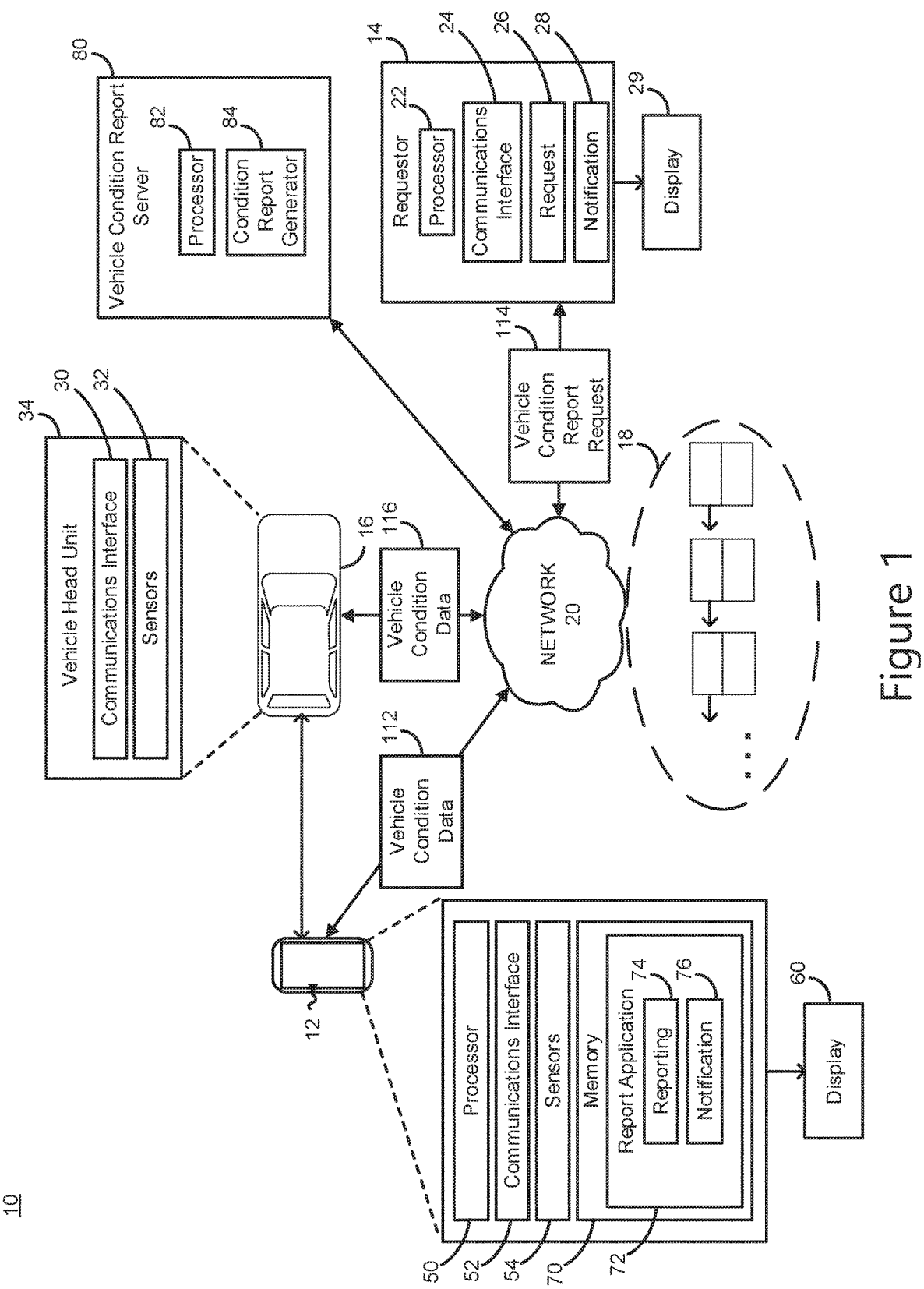
FIG. 1 depicts an example system in which vehicle condition data are generated for providing vehicle condition reports and transmitted to a distributed ledger network.

Techniques, systems, apparatuses, components, devices, and methods are disclosed for utilizing a distributed ledger, or blockchain, to record vehicle condition data. For example, a distributed ledger may be maintained by nodes, such as computing devices associated with vehicle manufacturers, insurance companies, vehicle rental companies, regulatory organizations, and/or other organizations involved in determining the value of a vehicle. The nodes receive transactions broadcasted to a distributed ledger network from vehicle head units within vehicles or mobile devices communicatively coupled to the vehicles. In some scenarios, the transactions include vehicle condition data associated with the vehicle which is indicative of wear and tear on the vehicle or fuel efficiency of the vehicle. The vehicle condition data may be indicative of the lifespan of the vehicle.

More specifically, vehicle condition data may include fuel consumption data, tire pressure data, acceleration data, speed data, emissions data, position data, mileage data, maintenance data, etc. In some embodiments, the vehicle condition data may be interpretations of raw sensor data, such as detecting a hard braking event for example when the vehicle decelerates by more than a threshold amount, detecting a hard acceleration event when the vehicle accelerates by more than a threshold amount, detecting a cornering event when the lateral acceleration for the vehicle exceeds a threshold amount, detecting a speeding event when the vehicle exceeds a threshold speed or exceeds a threshold speed relative to a speed limit, etc. The vehicle condition data may be collected and transmitted to the distributed ledger network in real-time (e.g., as the vehicle condition data are collected) or at least near real-time at each time interval in which the vehicle condition data are collected. In other embodiments, a set of vehicle condition data may be collected at several time intervals over a time period (e.g., a day), and the vehicle head unit or mobile device may generate and transmit a transaction which includes the set of vehicle condition data collected over the time period. The vehicle condition data may also include an indication of a time in which the vehicle condition data were generated The recorded vehicle condition data may then be retrieved to verify the authenticity of the vehicle condition data. For example, the vehicle condition data may be transmitted in a transaction to the distributed ledger network and to a server computing device for generating a vehicle condition report for the vehicle that generated the vehicle condition data. To ensure that the vehicle condition report is generated based at least in part upon reliable vehicle condition data, the server computing device may compare the vehicle condition data stored at the server computing device to the vehicle condition data in the distributed ledger network. Furthermore, a third-party requesting the vehicle condition report may receive the vehicle condition data within the vehicle condition report. The third-party may then verify the authenticity of the vehicle condition data used to generate the vehicle condition report by performing a comparison to the vehicle condition data in the distributed ledger.

Still further, distributed ledgers may be utilized to execute smart contracts, described in more detail below. An organization involved in determining the value of a vehicle can deploy a smart contract to the distributed ledger to generate a vehicle condition report based at least in part upon the vehicle condition data. In some embodiments, the smart contract may need a requester of the vehicle condition report to provide value in exchange for the vehicle condition report.

By utilizing distributed ledgers and in some scenarios, smart contracts to record vehicle condition data and generate vehicle condition reports, a trusted, secure, and immutable record of the vehicle condition data may be provided. The secure, immutable, and trustless nature of distributed ledgers is particularly important in vehicle condition reporting, where fraudulent activity has been known to occur to increase the perceived value of vehicles. Due to the difficulty of changing the recorded vehicle condition data in the distributed ledgers, competing entities do not have to trust that the data are reliable.

A blockchain (also referred to herein as a distributed ledger or a shared ledger) is a storage mechanism for data, events, transactions, etc. that is maintained by several participants. More specifically, a distributed ledger is a way of achieving a distributed consensus on the validity or invalidity of information in the distributed ledger. In other words, the blockchain provides a decentralized trust to participants and observers. As opposed to relying on a central authority, a blockchain is a decentralized database in which a transactional record of changes to the ledger is maintained and validated by each node of a peer-to-peer network. The distributed ledger is comprised of groupings of transactions organized together into a "block," and ordered sequentially (thus the term "blockchain"). While the distributed ledgers discussed herein are referred to in the context of a blockchain, this is merely one example of a distributed ledger. Distributed ledgers may also include a tangle, a block lattice, or other directed acyclic graph (DAG). In any event, nodes may join and leave the blockchain network over time and may obtain blocks that were propagated while the node was gone from peer nodes. Nodes may maintain addresses of other nodes and exchange addresses of known nodes with one another to facilitate the propagation of new information across the network in a decentralized, peer-to-peer manner.

The nodes that share the ledger form what is referred to herein as the distributed ledger network. The nodes in the distributed ledger network validate changes to the blockchain (e.g., when a new transaction and/or block is created) according to a set of consensus rules. The consensus rules depend on the information being tracked by the blockchain and may include rules regarding the chain itself. For example, a consensus rule may include that the originator of a change supply a proof-of-identity such that only approved entities may originate changes to the chain. A consensus rule may need that blocks and transactions adhere to format need and supply certain meta information regarding the change (e.g., blocks must be below a size limit, transactions must include a number of fields, etc.). Consensus rules may include a mechanism to determine the order in which new blocks are added to the chain (e.g., through a proof-of-work system, proof-of-stake, etc.).

Additions to the blockchain that satisfy the consensus rules are propagated from nodes that have validated the addition to other nodes that the validating node is aware of. If all the nodes that receive a change to the blockchain validate the new block, then the distributed ledger reflects the new change as stored on all nodes, and it may be said that distributed consensus has been reached with respect to the new block and the information contained therein, Any change that does not satisfy the consensus rule is disregarded by validating nodes that receive the change and is not propagated to other nodes. Accordingly, unlike a traditional system which uses a central authority, a single party cannot unilaterally alter the distributed ledger unless the single party can do so in a way that satisfies the consensus rules. The inability to modify past transactions leads to blockchains being generally described as trusted, secure, and immutable. This removes potential attack vectors for tampering with the vehicle condition data, such as a centralized database maintained by an organization involved in determining the value of a vehicle.

The validation activities of nodes applying consensus rules on a blockchain network may take various forms. In one implementation, the blockchain may be viewed as a shared spreadsheet that tracks data such as the vehicle condition data. In another implementation, the validating nodes execute code contained in "smart contracts" and distributed consensus is expressed as the network nodes agreeing on the output of the executed code.

A smart contract is a computer protocol that enables the automatic execution and/or enforcement of an agreement between different parties. In particular, the smart contract may be computer code that is located at a particular address on the blockchain. In some cases the smart contract may run automatically in response to a participant in the blockchain sending funds (e.g., a cryptocurrency such as bitcoin, ether, or other digital/virtual currency) to the address where the smart contract is stored. Additionally, smart contracts may maintain a balance of the amount of funds that are stored at their address. In some scenarios when this balance reaches zero the smart contract may no longer be operational.

The smart contract may include one or more trigger conditions, that, when satisfied, correspond to one or more actions. For some smart contracts, the action(s) performed may be determined based at least in part upon one or more decision conditions. In some instances, data streams may be routed to the smart contract so that the smart contract may detect that a trigger condition has occurred and/or analyze a decision condition.

Blockchains may be deployed in a public, decentralized, and permissionless manner meaning that any party may view the shared ledger, submit new information to be added to the ledger, or join the network as a validating node. Other blockchains are private (e.g., permissioned ledgers) that keep chain data private among a group of entities authorized to participate in the blockchain network.

The present embodiments relate to systems and methods for using a blockchain to record and manage information related to verifying the condition or longevity of vehicles. The blockchain may be either a public or permissioned ledger.

EXEMPLARY DISTRIBUTED LEDGER FOR VERIFYING LONGEVITY OF VEHICLES

FIG. 1 depicts an exemplary distributed ledger system 10 for recording vehicle condition data in accordance with one aspect of the present disclosure. A third party (e.g., requestor 14), such as an entity wishing to buy, sell, rent, and/or loan a vehicle, may wish to determine or verify the longevity and/or value of a vehicle (e.g., vehicle 16). Additionally, the vehicle (e.g., vehicle 16) and more specifically, a vehicle head unit 34 within the vehicle 16, and/or one or more mobile devices may detect and store vehicle condition data associated with the functioning of the vehicle 16. The distributed ledger system 100 includes a blockchain 18 accessible by network participants via a network 20 (e.g., a private or public packet switched network). The vehicle 16 may transmit vehicle condition data in transactions 116 to the blockchain 18. Additionally or alternatively, one or more mobile devices (e.g., mobile device 12) communicatively coupled to the vehicle 16 may transmit vehicle condition data in transactions 112 to the blockchain 18.

The vehicle head unit 34 may include a processor, a set of one or several sensors 32, and a communication interface 30. The set of sensors 32 may include, for example, a GPS module to determine the current position of the vehicle 16 in which the vehicle head unit 34 is installed, an IMU to measure the speed, acceleration, and current orientation of the vehicle 16, etc. Although FIG. 1 depicts the set of sensors inside the vehicle head unit 34, it is noted that the sensors 32 need not be integral components of the vehicle head unit 34. Rather, a vehicle may include any number of sensors in various locations, and the vehicle head unit 34 may receive data from these sensors during operation.

The communication interface 30 may allow the vehicle head unit 34 to communicate with the mobile device 12. The communication interface 30 may support wired or wireless communications, such as USB, Bluetooth, Wi-Fi Direct, Near Field Communication (NFC), etc. The communication interface 30 may allow the vehicle head unit 34 to communicate with various content providers, servers, the blockchain network, etc., via a wireless communication network such as a fourth- or third-generation cellular network (4G or 3G, respectively), a Wi-Fi network (802.11 standards), a WiMAX network, a wide area network (WAN), a local area network (LAN), etc. The processor may operate to format messages transmitted between the vehicle head unit 34 and the mobile device 12, process data from the sensors 32, transmit transactions to the blockchain network, etc.

Mobile device 12 may be associated with (e.g., in the possession of, configured to provide secure access to, etc.) a particular user, who may be a driver of a vehicle, such as vehicle 16. Mobile device 12 may be a personal computing device of that user, such as a smartphone, a tablet, smart glasses, or any other suitable device or combination of devices (e.g., a smart watch plus a smartphone) with wireless communication capability. In the embodiment of FIG. 1, mobile device 12 includes a processor 50, a communications interface 52, sensors 54, a memory 70, and a display 60. Processor 50 may include any suitable number of processors and/or processor types. Processor 50 may include one or more CPUs and one or more graphics processing units (GPUs), for example. Generally, processor 50 is configured to execute software instructions stored in memory 70. Memory 70 may include one or more persistent memories (e.g., a hard drive and/or solid state memory) and stores one or more applications, including report application 72, which may include reporting 74 and/or notification 76.

The mobile device 12 may be communicatively coupled to the vehicle head unit 34. For example, the mobile device 12 and the vehicle head unit 34 may communicate via USB, Bluetooth, Wi-Fi Direct, Near Field Communication (NFC), etc. For example, vehicle condition data or other sensor data in the vehicle 16 may be sent by the vehicle head unit 34 via communications interface 30 and received at the mobile device 12 via communications interface 52. In other embodiments, mobile device 12 may obtain the vehicle condition data from the vehicle 16 from sensors 54 within the mobile device 12. Further still, mobile device 12 may obtain vehicle condition data via a user interaction with a display 60 of the mobile device 12. For example, a user may take a photograph indicative of vehicle condition data and/or input information at the display 60 indicative of vehicle condition data. Reporting unit 74 may be configured to prompt a user to take a photograph or input information at the display 60. The mobile device 12 may then generate a transaction that includes the vehicle condition data and transmit the transaction 112 to the blockchain network via communications interface 52.

Vehicle 16 may obtain vehicle condition data associated with the vehicle indicative of (i) wear and tear on the vehicle and/or (ii) fuel efficiency of the vehicle. Additionally, the vehicle condition data may be indicative of a longevity of vehicle 16. Vehicle 16 may obtain the vehicle condition data from one or more sensors 32 within vehicle 16. The vehicle condition data may include telematics data (e.g., acceleration, braking, speed, cornering, mileage data, engine rotations per minute (RPM) and/or GPS data) and/or vehicle maintenance data, (e.g., fuel consumption data, tire condition data, engine condition data, emissions data), Vehicle condition data may be indicative of wear and tear on the vehicle or fuel efficiency of the vehicle which may indicate the longevity of the vehicle. For example, vehicle condition data may be used to determine that the vehicle 16 is likely to last longer than other similar vehicles (e.g., having the same make, model, and/or year). In another example, vehicle condition data may be used to determine that the vehicle 16 is likely to need repair and/or replacement earlier than other similar vehicles.

In some embodiments, the vehicle condition data may be interpretations of raw sensor data, such as detecting a hard braking event for example when the vehicle decelerates by more than a threshold amount, detecting a hard acceleration event when the vehicle accelerates by more than a threshold amount, detecting a cornering event when the lateral acceleration for the vehicle exceeds a threshold amount, detecting a speeding event when the vehicle exceeds a threshold speed or exceeds a threshold speed relative to a speed limit, etc. The vehicle condition data may be collected and transmitted to the blockchain network in real-time (e.g., as the vehicle condition data are collected) or at least near real-time at each time interval in which the vehicle condition data are collected. In other embodiments, a set of vehicle condition data may be collected at several time intervals over a time period (e.g., a day), and the vehicle head unit 34 or mobile device 12 may generate and transmit a transaction which includes the set of vehicle condition data collected over the time period. Also in some embodiments, the vehicle head unit 34 or mobile device 12 may generate and transmit transactions periodically (e.g., every minute, every hour, every data), where each transaction includes a different set of vehicle condition data collected over the most recent time period. In other embodiments, the vehicle head unit 34 or mobile device 12 may generate and transmit transactions as new vehicle condition data are received at the vehicle head unit 34 or mobile device.

Next, the vehicle head unit 34 may generate a transaction 116 including a representation of the vehicle condition data wherein the transaction 116 is stored in the blockchain 18. When entities broadcast transactions to the blockchain 18, the transactions may be accompanied by a proof-of-identity of the entity broadcasting the transaction. In one implementation, a cryptographic proof-of-identity is included in transactions sent to the blockchain. For example, each of the entities 12 and 34 may own private cryptographic keys that are associated with public cryptographic keys known to belong to the entity (e.g., public cryptographic keys associated with each of the entities may be published by a trusted third party or proven to other network participants, etc.). An entity wishing to broadcast a transaction to the blockchain 18 may sign a cryptographic message in the transaction with the entity's private cryptographic key to prove the identity of the entity broadcasting the transaction. In this way, other network participants may be provided with cryptographic proof that the information contained in the broadcast transaction was originated by the participating entity. Accordingly, generating the transaction 116 may include obtaining identify data associated with the vehicle head unit 34 and/or the vehicle 16, obtaining identity data for the mobile device 12 in the vehicle 16, and augmenting the transaction 116 with the identity data associated with the vehicle head unit 34, the vehicle 16, and/or the mobile device 12. The transaction 116 may include the vehicle condition data or a cryptographic hash value corresponding to the vehicle condition data.

Next, the vehicle head unit 34 may transmit, for example via communications interface 30, the transaction 116 to at least one other participant in a distributed ledger network of participants maintaining the distributed ledger. Additionally or alternatively, mobile device 12 may obtain vehicle condition data, generate a transaction 112 including a representation of the vehicle condition data wherein the transaction 112 is stored in the blockchain 18, and transmit, the transaction 112 to at least one other participant in a distributed ledger network of participants. The transaction 112 may include the vehicle condition data or a cryptographic hash value corresponding to the vehicle condition data. Further still, a third party device, such as a third party server (not pictured), may obtain vehicle condition data (e.g., from the vehicle 16 and/or the mobile device 12), generate a transaction including a representation of the vehicle condition wherein the transaction is stored in the blockchain 18, and transmit, the transaction to at least one other participant in a distributed ledger network of participants. The transaction 112 may include the vehicle condition data or a cryptographic hash value corresponding to the vehicle condition data.

In some embodiments, in addition to transmitting the vehicle condition data to at least one other participant in a distributed ledger network of participants, the mobile device 12 or the vehicle head unit 34 may transmit the vehicle condition data to a vehicle condition report server 80. The vehicle condition report server 80 includes a processor 82 and a memory that stores various application for execution by the processor 82. For example, a condition report generator 84 may obtain sets of vehicle condition data associated with a vehicle and analyze the sets of vehicle condition data to generate a vehicle condition report that indicates a current condition of the vehicle, In other embodiments, the condition report generator 84 obtains the sets of vehicle condition data associated with the vehicle from the blockchain 18.

In some embodiments, a third-party requestor 14 such as an entity wishing to buy, sell, rent, and/or loan a vehicle may transmit a request to the vehicle condition report server 80 for a vehicle condition report for a particular vehicle, such as vehicle 16. In response to the request, the vehicle condition report server 80 may generate a vehicle condition report based at least in part upon the obtained vehicle condition data associated with the vehicle 16. The vehicle condition report may include one or more descriptors indicative of the condition of the vehicle. The vehicle condition report server 80 may have previously obtained the vehicle condition data associated with the vehicle 16 from the mobile device 12 or the vehicle head unit 34 or may obtain the vehicle condition data by accessing transactions recorded on the blockchain 18 which are associated with the vehicle 16. The vehicle condition report server 80 may then transmit the vehicle condition report to the requestor 14 for presentation on the display 29. In some examples, the requestor 14 includes processor 22, communications interface 24, request 26, and/or notification 28.

In some scenarios, the vehicle condition report may be generated in response to receiving a payment from a user. For example, a user, via display 29, may transmit a request for a vehicle condition report for a particular vehicle to the vehicle condition report server 80 and submit payment for the vehicle condition report. In response to receiving the request and the payment, the vehicle condition report server 80 may generate and transmit the vehicle condition report for the particular vehicle to the requestor 14. The vehicle condition report may include a set of vehicle condition data used to generate the report, Additionally, the blockchain 18 may include cryptographic hash values corresponding to the set of vehicle condition data used to generate the vehicle condition report, To verify the authenticity of the set of vehicle condition data used to generate the report, the requestor 14 may compare the set of vehicle condition data included in the report to the corresponding cryptographic hash values in the blockchain 18. If the set of vehicle condition data used to generate the report does not match with the corresponding cryptographic hash values in the blockchain 18, the requestor 14 may determine that the vehicle condition data has been tampered with. Otherwise, if the set of vehicle condition data used to generate the report matches with the corresponding cryptographic hash values in the blockchain 18, the requestor 14 may determine that the vehicle condition data has not been tampered with and that the vehicle condition report is an accurate reflection of the condition of the vehicle.

The vehicle condition report may include vehicle condition metrics, such as a fuel efficiency and/or a vehicle maintenance and upkeep report for the vehicle 16. For example, the vehicle condition report may include vehicle condition metrics such as a fuel efficiency rating, a miles per gallon rating, a tire condition rating, and/or an engine condition rating. More specifically, the vehicle condition metrics may include an estimated average fuel consumption of the vehicle 16. Additionally or alternatively, the vehicle condition metrics in the vehicle condition report may include categorical metrics (e.g., the vehicle condition, tire condition, engine condition, and/or gas consumption is/are very good, good, fair, poor, or very poor). Further, the vehicle condition metrics in the vehicle condition report may include scores (e.g., the vehicle condition, tire condition, engine condition, and/or gas consumption may receive a numerical score out of 10 or out of 100). The vehicle condition report may include a comparison (e.g., the vehicle may be compared to other of the same or similar vehicles, and/or the manufacturer's published guidelines). The comparison may be expressed as a percentile rank and/or a category (e.g., better than an average of the same or similar vehicles), Furthermore, the vehicle condition metrics in the vehicle condition report may include an estimated longevity of the vehicle and/or components of the vehicle (e.g., the vehicle will likely function for 5 more year before needing a brake pad replacement) and the vehicle condition report may include an estimated value of the vehicle (e.g. this vehicle is worth 12,345 U.S. dollars).

The vehicle condition report server 80 may collectively or comparatively analyze the vehicle condition data to assess vehicle condition and/or to generate vehicle condition metrics. For example, mileage data may indicate a relatively high mileage (e.g. 100,000 miles as compared with an average of 75,000 miles for cars of the same year), whereas geopositioning data may indicate that the vehicle is predominately driven in rural areas of the state of Arizona. Independently, the high mileage may indicate low quality or value. However, when combined with geopositioning data, from which one could infer mostly highway driving (i.e. rural driving) in a dry climate (Arizona), the vehicle condition report server 80 may more moderately assess the vehicle quality and value, in the example case.

The vehicle condition report server 80 may generate vehicle condition descriptors to include in the vehicle condition report based at least in part upon the vehicle condition metrics. The vehicle condition descriptors may include, by way of example: (i) scores or ratings representing relative quality, value, mechanical operation, etc., such as a score between one and one hundred or a rating of one to five stars; (ii) text statements reflecting a condition, such as "low," "moderate," or "high" cost of ownership, "this car may have major repair needs within two years," etc.; (iii) graphical representations of condition information, such as graphs, plots, or charts indicating average engine temperature as a function of time, maintenance/repair events per year, etc.; (iv) images or icons, such as a thumbs up/down, caution sign icons, etc.

Vehicle condition metrics for the vehicle condition report may, in certain examples, be determined based at least in part upon a machine learning model. The machine learning model may be trained based at least in part upon (i) a plurality of sets of vehicle condition data for a plurality of vehicles having known longevity, estimated value, and/or estimated fuel consumption, for example, and (ii) indications of the longevity, estimated value, and/or estimated fuel consumption of the vehicles for the plurality of users. The vehicle condition data may be applied to the machine learning model to generate the vehicle condition metrics. For example, the machine learning model may be trained based at least in part upon a plurality of sets of average fuel consumption for Honda Civics having known lifespans and predict a lifespan for a particular Honda Civic.

In other embodiments, as an alternative to the vehicle condition report server 80 generating the vehicle condition report, the vehicle condition report for a vehicle may be generated automatically by deploying a smart contract to the blockchain network. The smart contract may be deployed by any participant in the blockchain network and may expose methods and data to other participants in the blockchain network. The smart contract may obtain vehicle condition data for a particular vehicle and generate a vehicle condition report based at least in part upon the vehicle condition data. Some of the data in the smart contract state may be private data that may only be altered by calling a method of the smart contract, or only altered by authorized blockchain participants. One way of altering the smart contract state is to broadcast a transaction to the distributed ledger network. If the broadcasted transaction satisfies consensus rules, network validators may include the transaction in a block. Inclusion in the blockchain of a transaction sending data to the smart contract may cause validating nodes to update a state database for the smart contract, thus allowing network participants access to a rich state mechanism to manage the analysis of the vehicle condition data, and ultimately to generate the vehicle condition report. In this implementation, transmitting a transaction (e.g., transactions 116 or 112) may include transmitting the transaction to an address that stores the smart contract on the blockchain 18.

In response to transmitting a transaction to the blockchain network, a validating node may add the transaction (e.g., transactions 116 or 112) to a block of transactions. Adding the transaction 116 and/or 112 to a block of transactions may include solving a cryptographic puzzle based at least in part upon the block of transactions, adding the solution to the cryptographic puzzle to the block of transactions, and transmitting the block of transactions to at least one other participant in the distributed ledger network.

In some implementation, to cryptographically link blocks and transactions together, each block in the blockchain 18 organizes its transactions into a Merkle Tree. In a Merkle Tree each transaction is hashed according to a cryptographic hashing algorithm (e.g., SHA-256) and the resulting output hash is then combined with the hash of another transaction. Then the combined result is also hashed according to the cryptographic hashing algorithm. This output is then combined with the hash of two other transactions and this process is repeated until all of the transactions in the block are combined and hashed to generate a Merkle root that is used in the header for a block. If any single transaction in the block is tampered with, a different Merkle root would be generated since the Merkle root is a combination of the hashes of all of the transactions in the block.

In other words, the transactions may be hashed using a cryptographic hash algorithm, such as the algorithms discussed above, and the hash of each transaction may be stored in the tree. As the tree is constructed the hash of each adjacent node at the same level may be hashed together to create a new node that exists at a higher level in the tree. Therefore, the node at the top of the tree or Merkle root, is dependent upon the hash of each transaction stored below in the tree, Each transaction may include a set of data. The set of data may include identifying data for the transaction, and transaction data identifying the nature of the transaction and what the transaction entails (e.g., input and output addresses, a transaction value, a document hash value, a timestamp, a transaction fee value, etc.).

To verify that a block is valid, a node may compare the Merkle root of the block to the Merkle root for the same block included in other nodes' copies of the blockchain. Thus, the Merkle root can be used as proof of the transactions included in the block and as proof that the contents of the block have not been tampered with if the Merkle root is the same in each node's copy of the block.

In one implementation, documents stored "on" a blockchain are documents that have been hashed according to a cryptographic hashing algorithm (e.g., SHA-256) and the resulting output hash has been included in a transaction in a block that has been accepted by the network nodes as satisfying the consensus rules of the blockchain. As such, the documents may be later verified or validated by comparing the hash of the documents to the hash stored on the blockchain. For example, if a set of documents results in a SHA-256 hash that was recorded on a blockchain on a certain date, then the blockchain provides cryptographic proof that the documents existed as of that date.

One way of storing a document on a blockchain is to broadcast a transaction including a hash of the document to the network, which will be included in a block if the transaction satisfies all of the consensus rules of the network. In some implementations, the blockchain is a permissioned ledger, meaning only authorized network participants may broadcast transactions. In other implementations, only some authorized network participants may make certain transactions. For example, vehicle condition data may be uploaded by the vehicle head unit 34 or the mobile device 12 to the blockchain 18. Only a cryptographic hash of the data may be included in the blockchain 18 such that the data may be verified using the blockchain even if it is obtained by a party off-chain.

Validating network nodes may verify that the signed transaction or signed message was signed by the private cryptographic key corresponding to the published public cryptographic key owned by the authorized vehicle manufacturer. In at least one implementation, a valid proof-of-identity may be applied as a consensus rule by the blockchain network. As such, any transaction attempting to add new vehicle condition data to the blockchain without a cryptographic proof-of-identity matching an identity authorized to add new vehicle condition data are rejected by the network as non-compliant with the consensus rule. Each vehicle head unit 34 and/or mobile device 12 may be assigned a public key/private key pair which is identified in the blockchain network as corresponding to the vehicle head unit 34 and/or mobile device 12. If the validating network nodes receive a transaction regarding vehicle condition data that is not from an authorized vehicle head unit 34 or mobile device 12, the validating network nodes reject the transaction.

The mobile device 12 and the vehicle 16 may be associated with the same user. Mobile device 12, and, in certain examples, vehicle 16, is/are communicatively coupled to requester 14 via a network 20. Network 20 may be a single communication network, or may include multiple communication networks of one or more types (e.g., one or more wired and/or wireless local area networks (LANs), and/or one or more wired and/or wireless wide area networks (WANs) such as the internet).

While FIG. 1 shows only one mobile device 12, it is understood that many different mobile devices (of different users), each similar to mobile device 12, may be in remote communication with network 20. Additionally, while FIG. 1 shows only one vehicle 16, it is understood that many different entity locations, each similar to vehicle 16, may be in remote communication with network 20. Further, while FIG. 1 shows only one requester, 14, it is understood that many different requesters, each similar to mobile device 12, may be in remote communication with network 20. Requestor 14 and/or any other participant maintaining the blockchain 18 may be an insurance company, a regulator organization, a vehicle rental company, and/or a vehicle manufacturer.

EXEMPLARY VALIDATING NODES IN A DISTRIBUTED LEDGER SYSTEM FOR VERIFYING LONGEVITY OF VEHICLES

Figure 2:
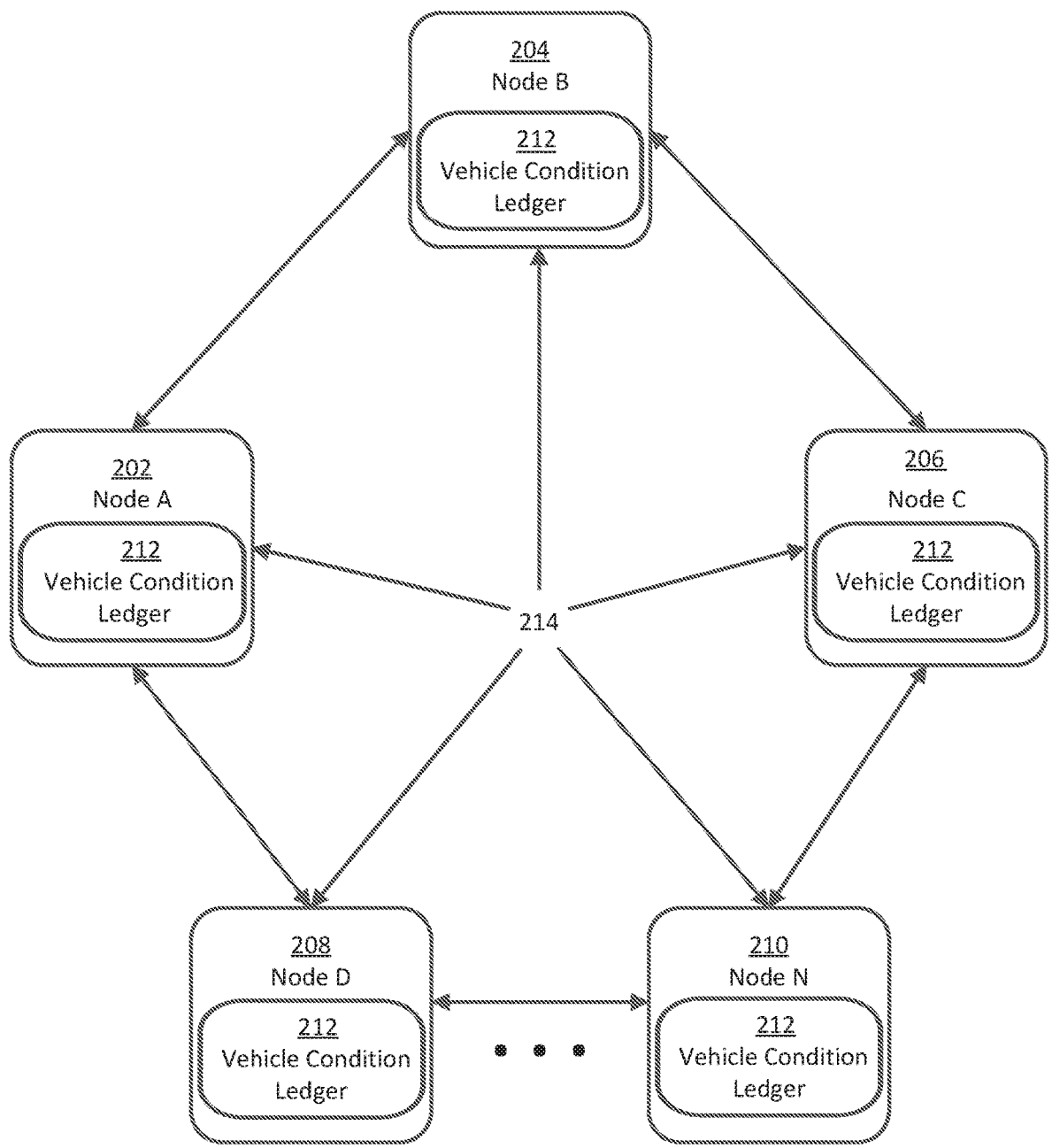
FIG. 2 depicts an exemplary distributed ledger system for recording transactions and executing smart contracts related to vehicle condition data, in accordance with one aspect of the present disclosure.

FIG. 2 depicts an exemplary distributed ledger system 200 for verifying longevity of vehicles in accordance with one aspect of the present disclosure. The system 200 includes a distributed vehicle condition ledger 212 and plurality of nodes 202, 204, 206, 208, and 210. Each node maintains a copy of the vehicle condition ledger 212. As changes are made to the vehicle condition ledger 212, each node receiving the change via network 214 updates its respective copy of the distributed vehicle condition ledger 212. A consensus mechanism may be used by the nodes 202, 204, 206, 208, and 210 in the distributed ledger system 200 to decide whether it is appropriate to make received changes to the vehicle condition ledger 212.

Each node in the system therefore has its own copy of the vehicle condition ledger 212, which is identical to every other copy of the vehicle condition ledger 212 stored by the other nodes. The distributed ledger system 200 is more robust than a central authority database system because of the distributed ledger's decentralized nature. As such, there is no single point of failure on the distributed ledger system 200 as there would be in a centralized system.

EXEMPLARY TRANSACTION FLOW & BLOCK PROPAGATION FLOW

Figure 3:
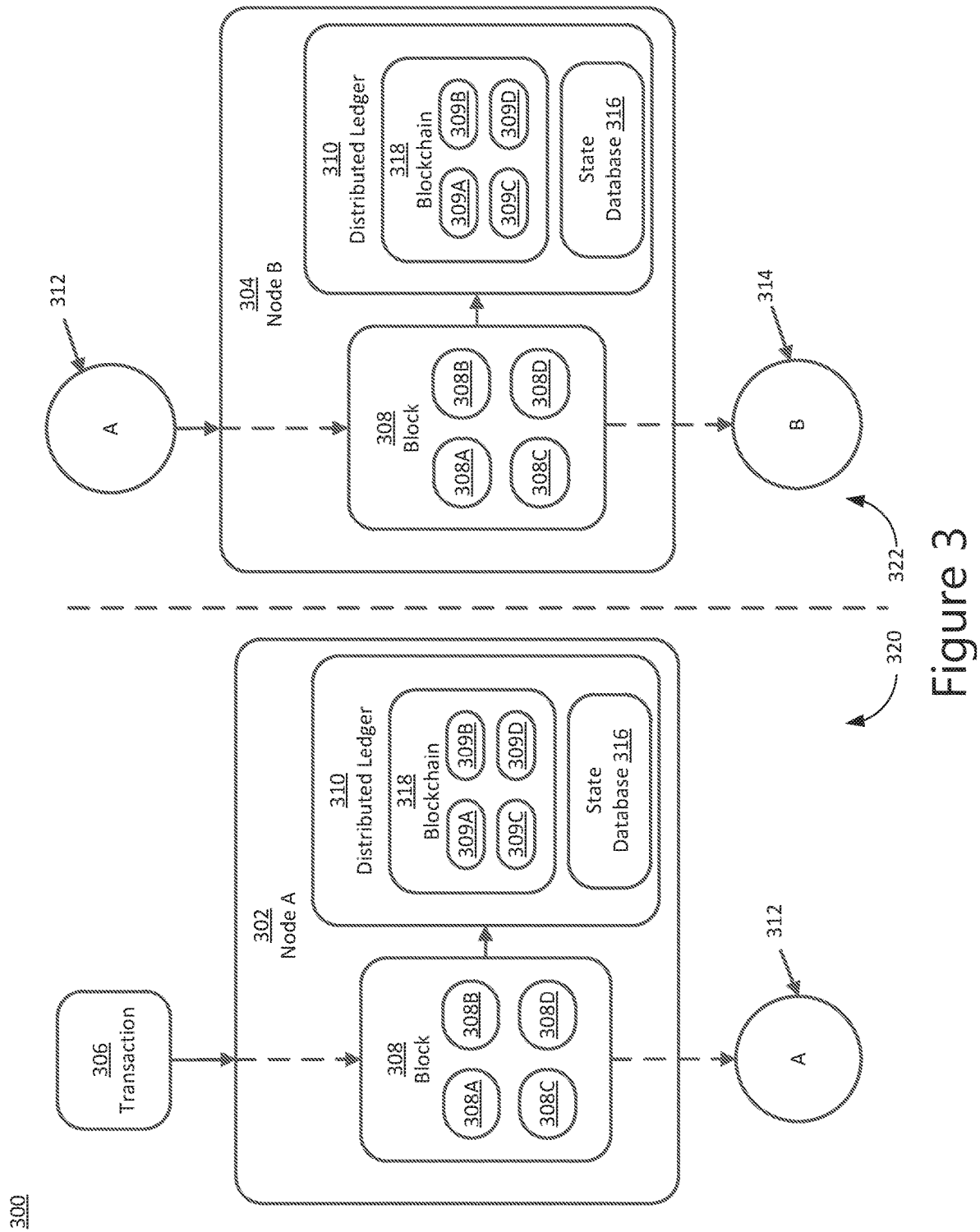
FIG. 3 depicts exemplary validating network nodes and an exemplary transaction flow on a distributed ledger network related to vehicle condition data, in accordance with one aspect of the present disclosure.

FIG. 3 depicts exemplary validating network nodes and an exemplary transaction flow 300 on a distributed ledger network for verifying longevity of vehicles in accordance with one aspect of the present disclosure. FIG. 3 includes two time frames 320 and 322 represented by the left and right sides of the dotted line, respectively, Node A 302 and Node B 304, a set of transactions 308A, 308B, 308C, and 308D, a set of blocks of transactions 309A, 309B, 309C, and 309D, a distributed ledger 310, and a blockchain 318.

The block propagation flow 300 may begin with Node A 302 receiving transaction 306 at time 320. When Node A 302 confirms that transaction 306 is valid, the Node A 302 may add the transaction to a newly generated block 308. As part of adding the transaction 306 to block 308, Node A 302 may solve a cryptographic puzzle and include the solution in the newly generated block 308 as proof of the work done to generate the block 308. In other embodiments, the transaction 306 may be added to a pool of transactions until a sufficient number of transactions in the pool exist to form a block. Node A 302 may transmit the newly created block 308 to the network at 312. Before or after propagating the block 308, Node A 302 may add the block 308 to its copy of the blockchain 318.

The transactions 309A, 309B, 309C, and 309D may include updates to a state database 316. The state database 316 may contain current values of variables created by smart contracts deployed on the blockchain 318. Validated blocks such as block 308 may include transactions affecting state variables in state database 316. At time 322 Node B 304 may receive the newly created block 308 via the network at 312. Node B 304 may verify that the block of transactions 308 is valid by checking the solution to the cryptographic puzzle provided in the block 308. If the solution is accurate then Node B 304 may add the block 308 to its blockchain 318 and make any updates to the state database 316 as rejected by the transactions in block 308. Node B 304 may then transmit the block 308 to the rest of the network at 314.

EXEMPLARY NODE

Figure 4:
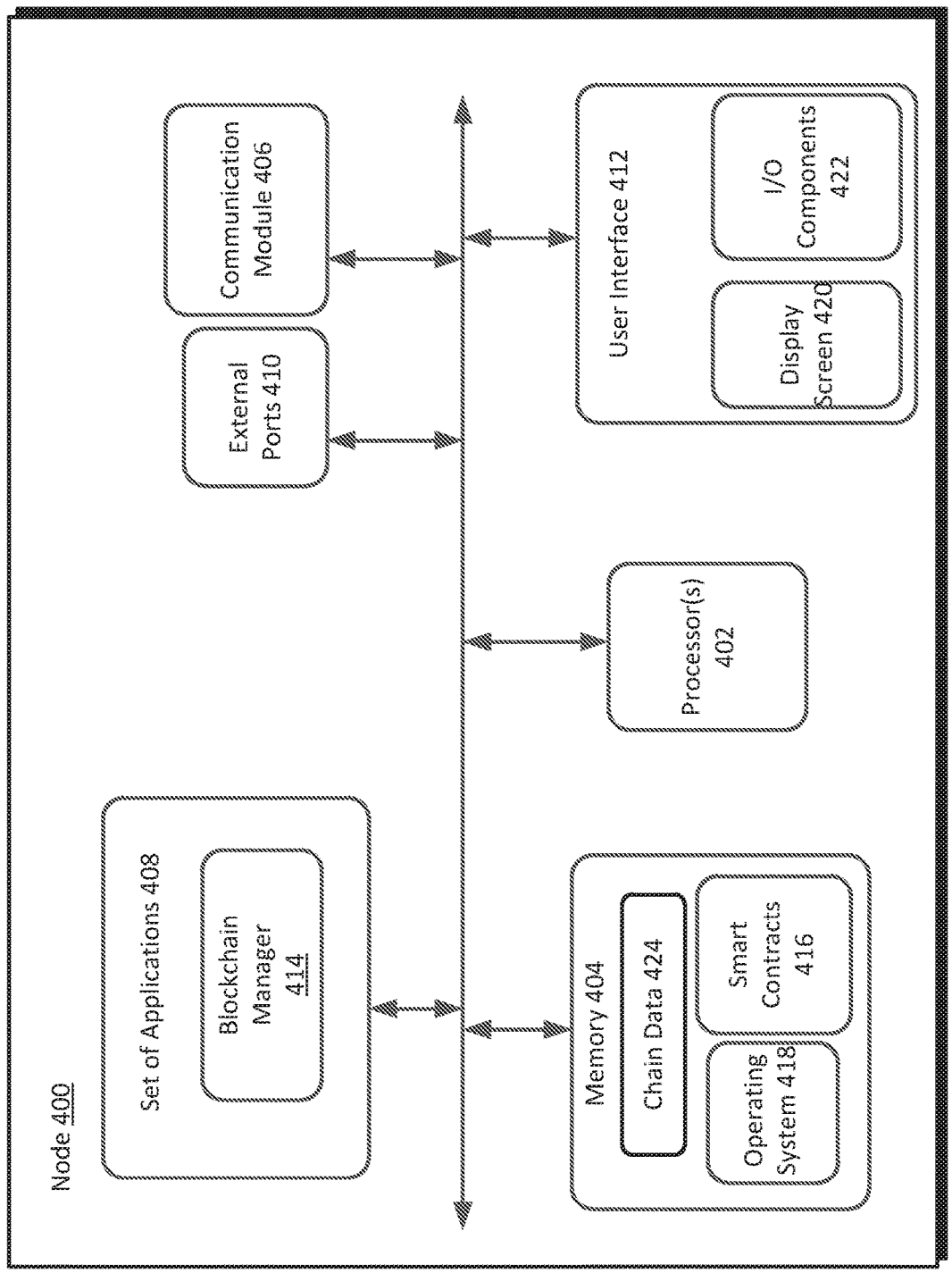
FIG. 4 depicts exemplary components of a network node on a distributed ledger network related to vehicle condition data, in accordance with one aspect of the present disclosure.

FIG. 4 depicts exemplary components of a network node 400 on a distributed ledger network for verifying longevity of vehicles in accordance with one aspect of the present disclosure. Node 400 is capable of performing the functionality disclosed herein. Node 400 may include one processor 402, memory 404, a communication module 406, a set of applications 408, external ports 410, user interface 412, a blockchain manager 414, smart contracts 416, operating system 418, a display screen 420, and input/output components 422. In some embodiments, the node 400 may generate a new block of transactions or may broadcast transactions to other network nodes by using the blockchain manager 414. Similarly, the node 400 may use the blockchain manager 414 in conjunction with the smart contracts 416 stored in memory 404 to execute the functionality disclosed herein. The memory 404 may further include chain data 424 including, for example, a state database of the blockchain for storing state of smart contracts deployed thereon.

In other embodiments, the smart contracts 416 operate independent of the blockchain manager 414 or other applications. In some embodiments, node 400 does not have a blockchain manager 414, or smart contracts 416 stored at the node. In some embodiments, the node 400 may have additional or less components than what is described. The components of the node 400 are described in more detail below.

The node 400, as part of a decentralized ledger system 112, or another decentralized or centralized network, may be used as part of systems that interact with and/or manipulate data and transactions associated with the vehicle condition data aggregation process and the vehicle condition report generation process.

EXEMPLARY VEHICLE CONDITION TRANSACTION

Figure 5:
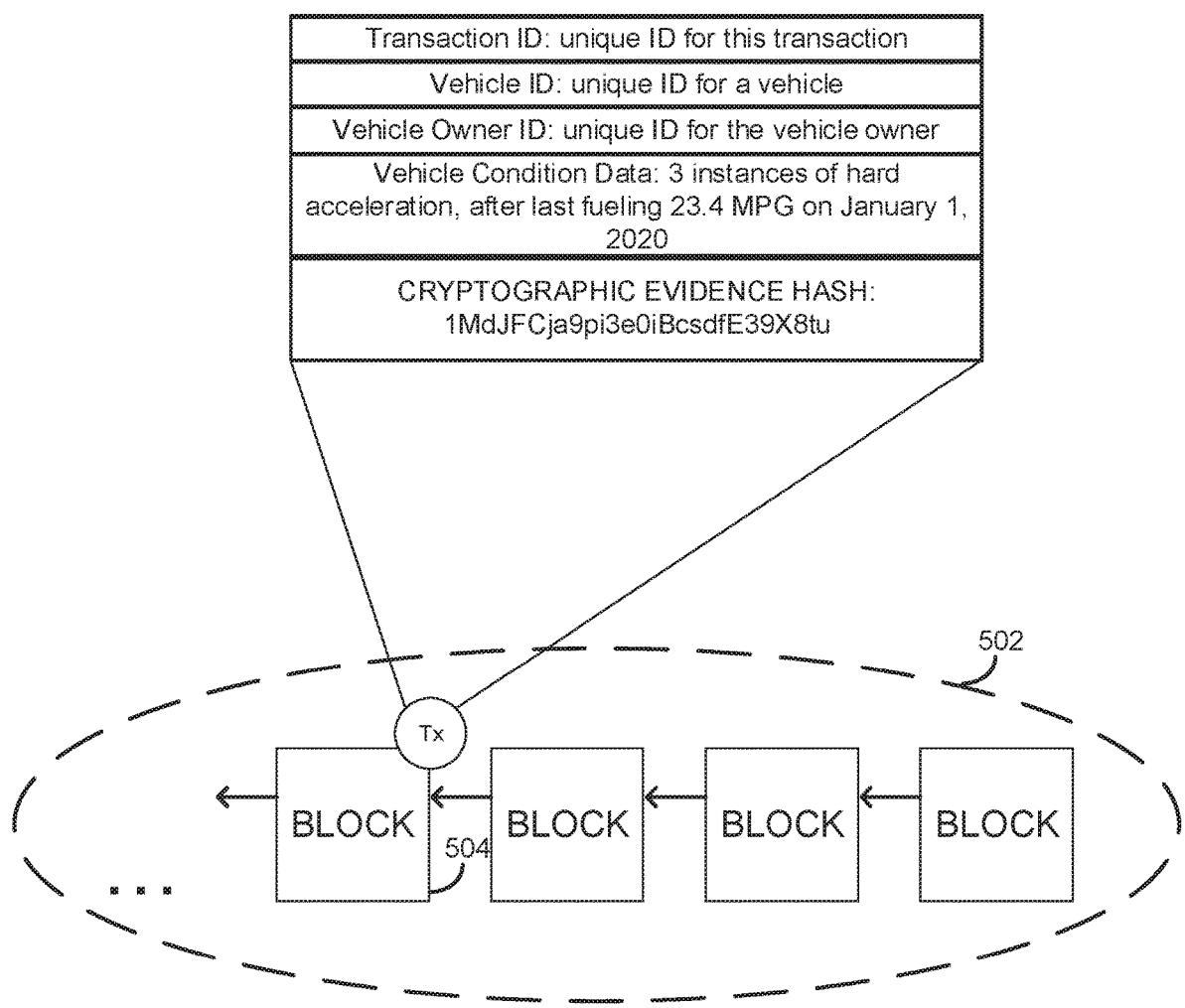
FIG. 5 depicts an exemplary transaction representing vehicle condition data generated by the vehicle or a mobile device communicatively coupled to the vehicle.

FIG. 5 depicts an exemplary transaction 500 on a distributed ledger network for verifying longevity of vehicles in accordance with one aspect of the present disclosure. The transaction 500 may be generated by a vehicle head unit 34 within a vehicle 16 or by a mobile device 12 communicatively coupled to the vehicle. When the vehicle head unit 34 or mobile device obtains a set of vehicle condition data for example, based at least in part upon receiving data from the vehicle sensors 32 or based at least in part upon collected data from the vehicle sensors 32 over a particular time period (e.g., one minute, 10 minutes, one hour, etc.), the vehicle head unit 34 or mobile device 12 broadcasts the transaction 500 to blockchain 502 to be included in a block, such as block 504.

The transaction 500 may include various information regarding the vehicle condition data. For example, the transaction 500 may include a transaction ID and an originator such as the mobile device 12 (identified by a cryptographic proof-of-identity). The transaction 500 may also include identification information for the vehicle 16 (a vehicle ID), and the vehicle condition data including an indication of a time in which the vehicle condition data were generated. Furthermore, the transaction 500 may include a cryptographic hash corresponding to the vehicle condition data. In another implementation, the vehicle condition data are not stored as a cryptographic hash, but is directly accessible in block 504 by an observer or other network participant.

EXEMPLARY SMART CONTRACT STATE

As described above, a participant in the distributed ledger network such as a computing device associated with a vehicle manufacturer, an insurance company, a vehicle rental company, a regulatory organization, and/or another organization involved in determining the value of a vehicle may deploy smart contracts to the distributed ledger to generate a vehicle condition report and/or exchange value for the vehicle condition report. In some embodiments, the organization involved in determining the values of vehicles may deploy different smart contracts for each vehicle to a different address on the blockchain. Accordingly, a user requesting a vehicle condition report for a particular vehicle may transmit the request to the address for the smart contract corresponding to the vehicle. In this manner, a first vehicle condition report for a first vehicle may be provided to a first user and a second vehicle condition report for a second vehicle may be provided to a second user.

Figure 6:
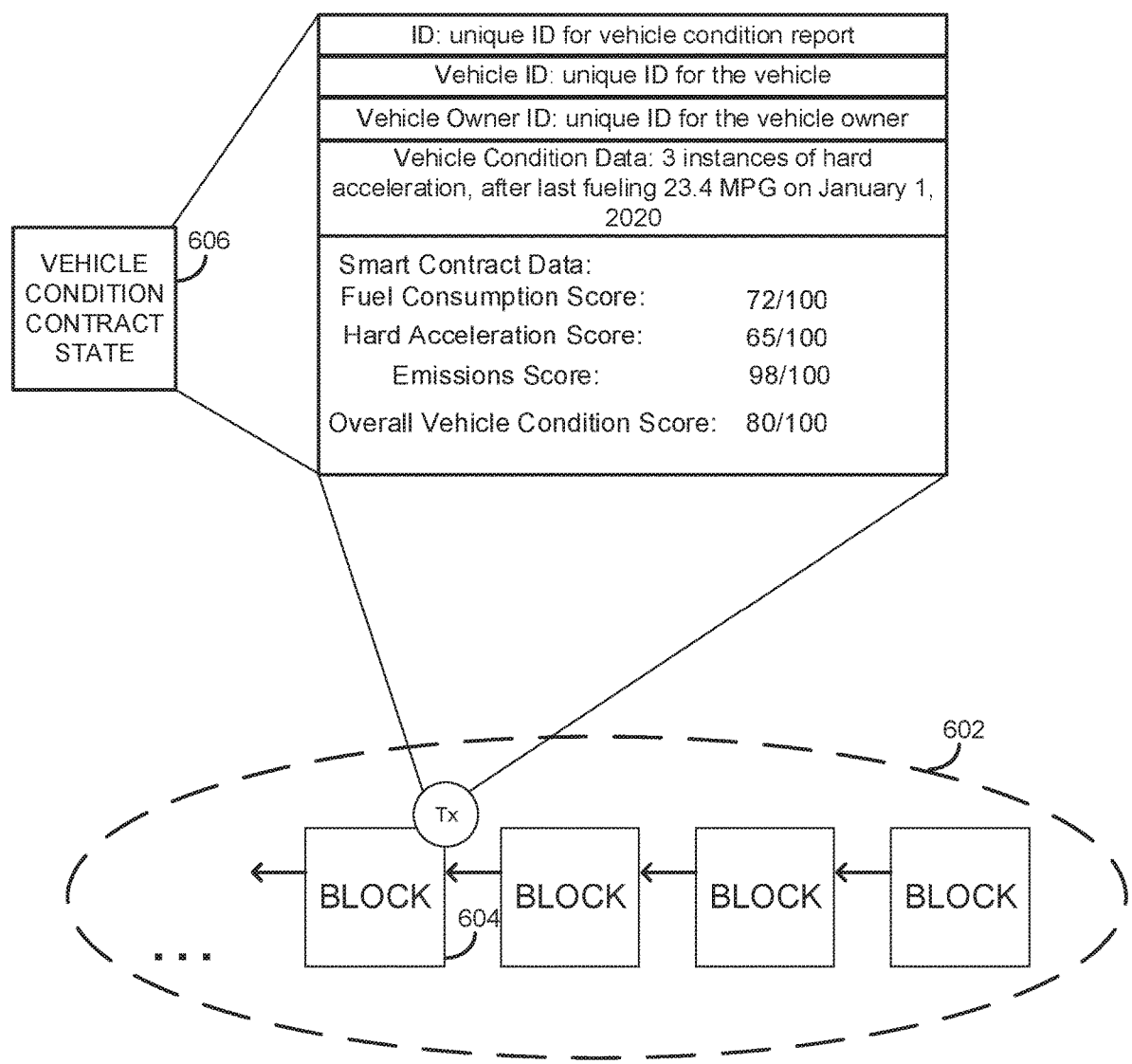
FIG. 6 depicts an exemplary smart contract state in a distributed ledger network for generating a vehicle condition report for a vehicle.

FIG. 6 depicts an exemplary smart contract state 600 in a distributed ledger network for generating a vehicle condition report in accordance with one aspect of the present disclosure. FIG. 6 includes a blockchain 602, a block of transactions 604, and a vehicle condition smart contract state 606. A smart contract may be deployed by any participant in the vehicle condition blockchain network to establish a contract state 606 for a particular smart vehicle condition report request 114. The deployed smart contract may expose methods and data to other participants in the vehicle condition blockchain network. Some of the data in the smart contract state may be private data that may only be altered by calling a method of the smart contract or only altered by authorized blockchain participants.

One way of altering the smart contract state 606 is to broadcast a transaction to the blockchain network. If the broadcast transaction satisfies consensus rules, network validators may include the transaction in a block 604. Inclusion in the blockchain 602 of a transaction sending data to the smart contract may cause validating nodes to update a state database, thus allowing network participants access to a rich state mechanism to manage the analysis of the vehicle condition data, and ultimately to generate the vehicle condition report.

Vehicle condition contract state 606 may include pieces of data to identify and track the vehicle condition request. For example, a contract owner may select a unique ID for the vehicle condition report such that subsequent transactions and data sent to the smart contract can identify the vehicle condition report by ID number. The contract owner may also specify an identity of the vehicle 16 and identities of devices authorized to provide vehicle condition data associated with the vehicle, such as the vehicle head unit 34 and/or the mobile device 12. In at least one implementation, the vehicle 16, the vehicle head unit 34, and/or the mobile device 12 are identified by cryptographic public keys assigned to the respective entities. Subsequent data sent to the smart contract may include a message signed by private keys corresponding to the public keys identifying the vehicle head unit 34 and/or the mobile device 12 in the smart contract, thus providing cryptographic proof that the transaction was originated by an authorized vehicle head unit 34 and/or an authorized mobile device 12. The private and public keys may be managed solely by the parties to minimize the attack surface for any attackers that might attempt to forge a transaction (e.g., the parties generate public/private cryptographic key pairs offline and only provide the public key to other network participants). A party's private keys may be generated according to a securely stored seed value (e.g., on a piece of physical paper or multiple copies of a piece of paper) such that the private keys may be recovered in the case of a data loss.

To generate the vehicle condition report for the vehicle 16, the smart contract state 606 may obtain evidence of the condition of the vehicle. The evidence of the condition of the vehicle may include vehicle condition data associated with the vehicle, such as fuel consumption data, tire pressure data, acceleration data, speed data, emissions data, position data, mileage data, maintenance data, etc. In some embodiments, the vehicle condition data may be interpretations of raw sensor data, such as detecting a hard braking event for example when the vehicle decelerates by more than a threshold amount, detecting a hard acceleration event when the vehicle accelerates by more than a threshold amount, detecting a cornering event when the lateral acceleration for the vehicle exceeds a threshold amount, detecting a speeding event when the vehicle exceeds a threshold speed or exceeds a threshold speed relative to a speed limit, etc. The vehicle condition data may include vehicle condition data generated at a particular time interval or at several time intervals over a particular time period.

The vehicle head unit 34 and/or the mobile device 12 may broadcast transactions to the blockchain 602 that includes the evidence. The evidence may be cryptographically signed to provide cryptographic proof-of-identity that the evidence came from a vehicle head unit 34 and/or mobile device 12 authorized to provide vehicle condition data associated with the vehicle 16. Accordingly, the smart contract may compare the provided identity to a list of vehicle head units 34 and/or mobile devices 12 authorized to provide vehicle condition data associated with the vehicle 16.

Another aspect of the smart contract state 606 is the smart contract data. Smart contract data may be thought of like the private and public data in an object created according to an object-oriented programming paradigm in that the smart contract data may be directly updated from outside the object, or the smart contract data may be updated only in limited ways, such as by calling a method of the smart contract. The smart contract data may include vehicle condition metrics which are generated based at least in part upon the vehicle condition data, such as a fuel efficiency score, a hard acceleration score, an emissions score, an overall vehicle condition score, and/or any other data indicative of the condition of the vehicle which may be included in the vehicle condition report. The fuel consumption score may be determined based at least in part upon an analysis of the most recently obtained fuel consumption data (e.g., an average of 25 mpg for the most recent tank of gas) or may be determined based at least in part upon an analysis of fuel consumption data collected over time (e.g., a 3% improvement in average fuel consumption in each of the last three months). Likewise, the hard acceleration score, the emissions score, and the overall vehicle condition score may be determined based at least in part upon the most recently obtained data or data collected over time. In some embodiments, the overall condition score may be determined based at least in part upon any suitable combination of the other scores.

In some embodiments, the smart contract may generate the vehicle condition report based at least in part upon the smart contract data. For example, the vehicle condition report may include vehicle condition descriptors in accordance with the smart contract data, such as: (i) scores or ratings representing relative quality, value, mechanical operation, etc., such as a score between one and one hundred or a rating of one to five stars; (ii) text statements reflecting a condition, such as "low," "moderate," or "high" cost of ownership, "this car may have major repair needs within two years," etc.; (iii) graphical representations of condition information, such as graphs, plots, or charts indicating average engine temperature as a function of time, maintenance/repair events per year, etc.; (iv) images or icons, such as a thumbs up/down, caution sign icons, etc. In some embodiments, the smart contract may transmit the generated vehicle condition report to the requestor 14 or to an address on the blockchain 602 which is associated with the requestor 14.

EXEMPLARY DISTRIBUTED LEDGER OPERATIONS

Figure 7:
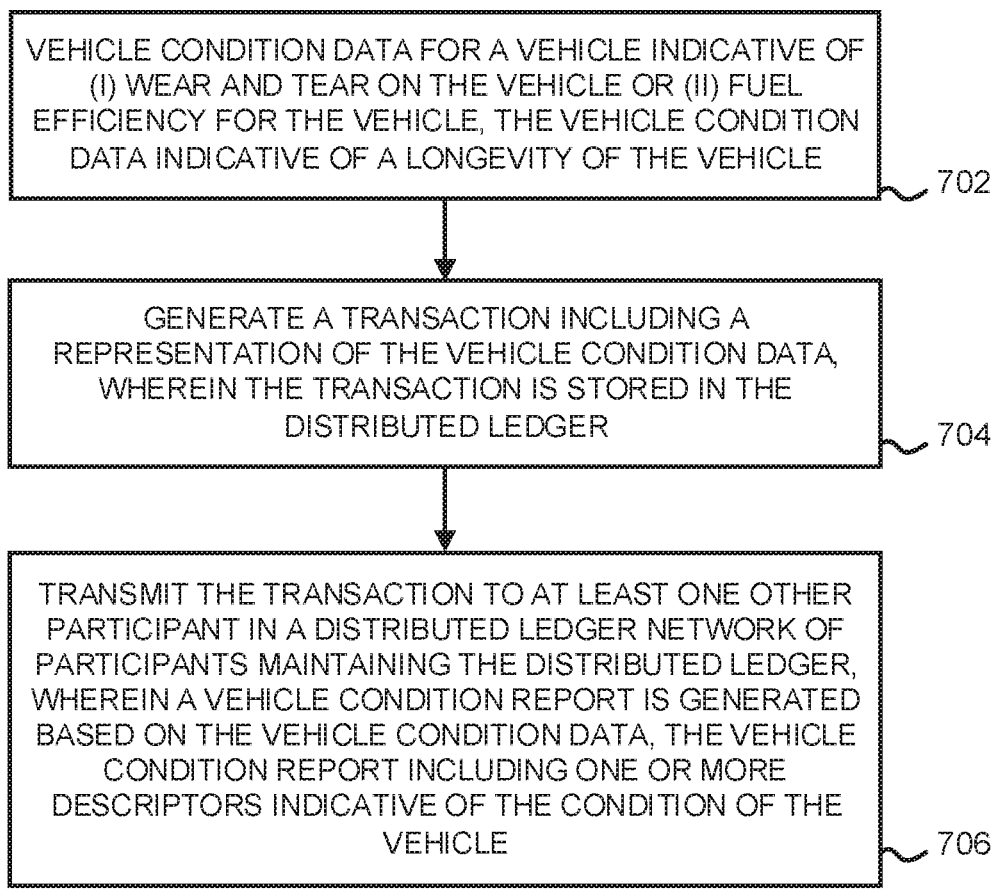
FIG. 7 depicts a flow diagram representing an exemplary method for recording vehicle condition data using a distributed ledger.

FIG. 7 is a flow diagram of an example method 700 for verifying longevity of vehicles using a distributed ledger maintained by a plurality of participants. The method 700 may be implemented by one or more processors of a computing system such as vehicle 16 or mobile device 12, for example.

In the method 700, at block 702 vehicle condition data associated with a vehicle indicative of (i) wear and tear on the vehicle or (ii) fuel efficiency of the vehicle is obtained. The vehicle condition data are also indicative of a longevity of the vehicle. A transaction including a representation of the vehicle condition data, where the transaction is stored in the distributed ledger, is generated at block 704. At block 706, the transaction is transmitted to at least one other participant in a distributed ledger network of participants maintaining the distributed ledger, where a vehicle condition report is generated based at least in part upon the vehicle condition data, The vehicle condition report includes one or more descriptors indicative of the condition of the vehicle.

Although specific embodiments of the present disclosure have been described, it will be understood by those of skill in the art that there are other embodiments that are equivalent to the described embodiments. Accordingly, it is to be understood that the present disclosure is not to be limited by the specific illustrated embodiments.

What is claimed:

1. A validating network node for validating vehicle condition data transactions in a distributed ledger network, the node comprising:
   a transceiver configured to exchange distributed ledger data with peer network nodes, the distributed ledger data including transactions having vehicle condition data indicative of a longevity of the vehicle based on at least one selected from a group consisting of wear and tear on the vehicle and fuel efficiency of the vehicle;
   a storage media configured to store a copy of a distributed ledger; and
   a validator configured to apply a set of consensus rules to the distributed ledger data received from the peer network nodes, wherein the validator is further configured to:
     append the distributed ledger data received from the peer network nodes to the copy of the distributed ledger if the distributed ledger data satisfies the set of consensus rules;
     disregard the distributed ledger data received from the peer network nodes if the distributed ledger data does not satisfy the set of consensus rules;
     execute code in a smart contract configured to generate a vehicle condition report based at least in part upon the vehicle condition data, the vehicle condition report including one or more descriptors indicative of the condition of the vehicle;
     generate a solution to solve a cryptographic puzzle based at least in part upon the distributed ledger data received from the peer network nodes;
     add the solution to the cryptographic puzzle to the copy of the distributed ledger; and
     transmit the copy of the distributed ledger to at least one other participant in the distributed ledger network;
   wherein the set of consensus rules comprise a rule on a proof-of-work.

2. The validating network node of claim 1, wherein the validator is further configured to update a state database associated with the smart contract, the state database including one or more sets of vehicle condition data.

3. The validating network node of claim 2, wherein the vehicle condition report includes a vehicle condition metric, the vehicle condition metric includes one of an estimated lifetime of the vehicle, an estimated value of the vehicle, and an estimated average fuel consumption of the vehicle.

4. The validating network node of claim 3, wherein to generate the vehicle condition metric includes to train a machine learning model for generating the vehicle condition metric.

5. The validating network node of claim 2, wherein the vehicle condition report is generated further based in part upon receiving a payment from a user.

6. The validating network node of claim 2, wherein the smart contract is a first smart contract, the vehicle condition report is a first vehicle condition report, and wherein the validator is further configured to execute code in one or more additional smart contracts that generates one or more additional vehicle condition reports based at least in part upon the vehicle condition data.

7. The validating network node of claim 6, wherein the validator is further configured to send a first vehicle condition report to a first user and send a second vehicle condition report to a second user.

8. A device for validating vehicle condition data transactions in a distributed ledger network, the device comprising:
   means for transceiving configured to exchange distributed ledger data with peer network nodes, the distributed ledger data including transactions having vehicle condition data indicative of a longevity of the vehicle based on at least one selected from a group consisting of wear and tear on the vehicle and fuel efficiency of the vehicle;
   means for storage media configured to store a copy of a distributed ledger; and
   means for validating configured to apply a set of consensus rules to the distributed ledger data received from the peer network nodes, wherein the means for validating is further configured to:
      append the distributed ledger data received from the peer network nodes to the copy of the distributed ledger if the distributed ledger data satisfies the set of consensus rules;
      disregard the distributed ledger data received from the peer network nodes if the distributed ledger data does not satisfy the set of consensus rules;
      execute code in a smart contract configured to generate a vehicle condition report based at least in part upon the vehicle condition data, the vehicle condition report including one or more descriptors indicative of the condition of the vehicle;
      generate a solution to solve a cryptographic puzzle based at least in part upon the distributed ledger data received from the peer network nodes;
      add the solution to the cryptographic puzzle to the copy of the distributed ledger; and
      transmit the copy of the distributed ledger to at least one other participant in the distributed ledger network;
   wherein the set of consensus rules comprise a rule on a proof-of-work.

9. The device of claim 8, wherein the means for validating is further configured to update a state database associated with the smart contract, the state database including one or more sets of vehicle condition data.

10. The device of claim 9, wherein the vehicle condition report includes a vehicle condition metric, the vehicle condition metric includes one of an estimated lifetime of the vehicle, an estimated value of the vehicle, and an estimated average fuel consumption of the vehicle.

11. The device of claim 10, wherein the means for validating is further configured to train a machine learning model for generating the vehicle condition metric.

12. The device of claim 9, wherein the vehicle condition report is generated further based in part upon receiving a payment from a user.

13. The device of claim 9, wherein the smart contract is a first smart contract, the vehicle condition report is a first vehicle condition report, and wherein the means for validating is further configured to execute code in one or more additional smart contracts that generates one or more additional vehicle condition reports based at least in part upon the vehicle condition data.

14. The device of claim 13, wherein the means for validating is further configured to send a first vehicle condition report to a first user and send a second vehicle condition report to a second user.

* * * * *